US 011797090B2

United States Patent
Dekel et al.

(10) Patent No.: US 11,797,090 B2
(45) Date of Patent: Oct. 24, 2023

(54) STYLUS HAPTIC OUTPUT

(71) Applicant: Microsoft Technology Licensing, LLC, Redmond, WA (US)

(72) Inventors: Shoham Dekel, Tel Aviv (IL); Assaf Bar-Ness, Ness Zionna (IL); Vadim Mishalov, Tel-Aviv (IL); Uri Ron, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/319,901

(22) Filed: May 13, 2021

(65) Prior Publication Data

US 2022/0365602 A1 Nov. 17, 2022

(51) Int. Cl.
*G06F 3/01* (2006.01)
*G06F 3/041* (2006.01)
*G06F 3/03* (2006.01)
*G06F 3/0346* (2013.01)
*G06F 3/0354* (2013.01)

(52) U.S. Cl.
CPC ............ *G06F 3/016* (2013.01); *G06F 3/0317* (2013.01); *G06F 3/0346* (2013.01); *G06F 3/03545* (2013.01); *G06F 3/03546* (2013.01); *G06F 3/04162* (2019.05)

(58) Field of Classification Search
CPC ...... G06F 3/016; G06F 3/0317; G06F 3/0346; G06F 3/03546; G06F 3/04162; G06F 3/03545
See application file for complete search history.

(56) References Cited

U.S. PATENT DOCUMENTS

| | | | |
|---|---|---|---|
| 8,681,130 B2 | 3/2014 | Adhikari | |
| 9,383,839 B1 * | 7/2016 | Rost | G06F 3/03545 |
| 9,430,106 B1 * | 8/2016 | Olsen | G06F 3/03545 |
| 9,690,377 B2 | 6/2017 | Lee et al. | |

(Continued)

FOREIGN PATENT DOCUMENTS

| | | |
|---|---|---|
| EP | 2924545 A1 | 9/2015 |
| EP | 3792735 A1 | 3/2021 |

OTHER PUBLICATIONS

Cho, et al., "Realpen: Providing Realism In Handwriting Tasks On Touch Surfaces Using Auditory-Tactile Feedback", In Proceedings of the 29th Annual Symposium on User Interface Software and Technology, Oct. 16, 2016, pp. 195-205.

(Continued)

*Primary Examiner* — William Boddie
*Assistant Examiner* — Saifeldin E Elnafia
(74) *Attorney, Agent, or Firm* — Alleman Hall Creasman & Tuttle LLP

(57) ABSTRACT

Examples are disclosed relating to providing haptic output to a stylus. In one example, rotational position data indicating a rotational position of the stylus about a longitudinal axis of the body of the stylus is received. Travel direction data indicating a direction of travel of a tip of the stylus relative to a touch-sensitive screen of a computing device is also received. Using at least the rotational position data and the travel direction data, one or more characteristics of a drive signal are determined. The drive signal is then transmitted to a haptic feedback mechanism within the body of the stylus to generate haptic output at the body.

19 Claims, 10 Drawing Sheets

(56) References Cited

U.S. PATENT DOCUMENTS

| | | |
|---|---|---|
| 10,133,370 B2 | 11/2018 | Evreinov et al. |
| 10,296,089 B2* | 5/2019 | Peretz et al. |
| 10,671,186 B2* | 6/2020 | Ribeiro .................. G06F 3/016 |
| 10,691,209 B2 | 6/2020 | Huizar et al. |
| 2007/0236450 A1 | 10/2007 | Colgate et al. |
| 2012/0293463 A1 | 11/2012 | Adhikari |
| 2012/0293464 A1 | 11/2012 | Adhikari |
| 2014/0300587 A1 | 10/2014 | Krete |
| 2014/0340328 A1* | 11/2014 | Kameyama ......... G06F 3/03545 345/173 |
| 2015/0220169 A1* | 8/2015 | Keating .............. G06F 3/03545 345/179 |
| 2016/0054820 A1 | 2/2016 | Sezgin et al. |
| 2016/0282970 A1 | 9/2016 | Evreinov et al. |
| 2017/0185151 A1 | 6/2017 | Pahud et al. |
| 2017/0235410 A1* | 8/2017 | Costa .................... G06F 3/0446 345/174 |
| 2018/0246588 A1* | 8/2018 | Bostick ................. G06F 3/0482 |
| 2019/0025921 A1 | 1/2019 | Hwang |
| 2019/0212838 A1 | 7/2019 | Takeda et al. |
| 2019/0369752 A1 | 12/2019 | Ikeda et al. |
| 2019/0384402 A1 | 12/2019 | Huizar et al. |
| 2021/0004113 A1 | 1/2021 | Autio et al. |
| 2021/0286450 A1* | 9/2021 | Han ...................... G06F 3/0442 |

OTHER PUBLICATIONS

"International Search Report and Written Opinion Issued in PCT Application No. PCT/US22/023948", dated Jul. 13, 2022, 11 Pages.

* cited by examiner

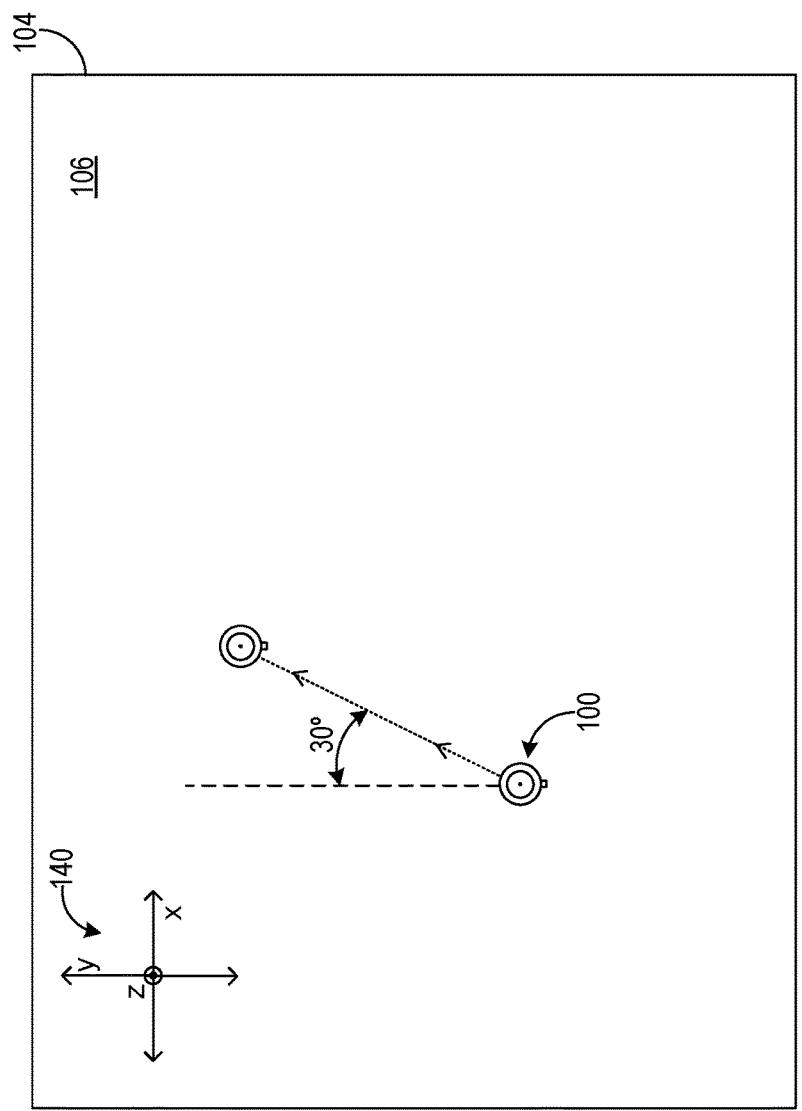
FIG. 9
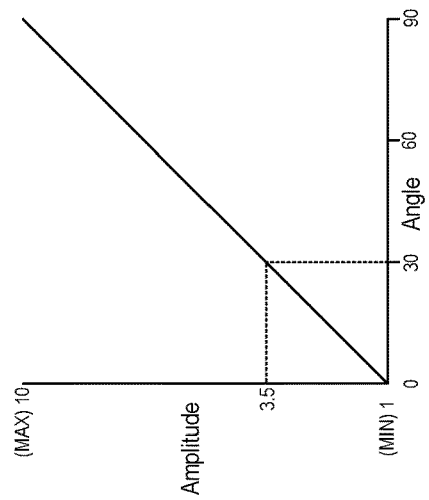
FIG. 8
| Angle Range (degs) | Waveform |
|---|---|
| 0 - 5.0 | A |
| 5.1 - 10.0 | B |
| 10.1 - 15.0 | C |
| 15.1 - 20.0 | D |
| 20.1 - 25.0 | E |
| 25.1 - 30.0 | F |
| ••• | ••• |
| 85.1 - 90.0 | R |
FIG. 10

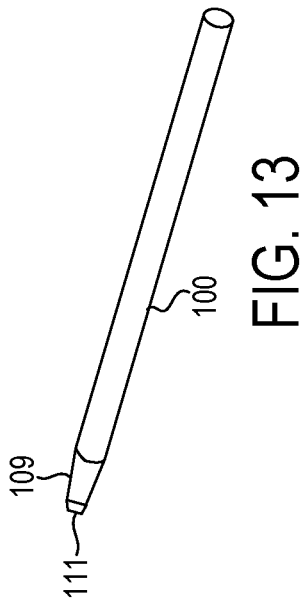
FIG. 12
FIG. 13
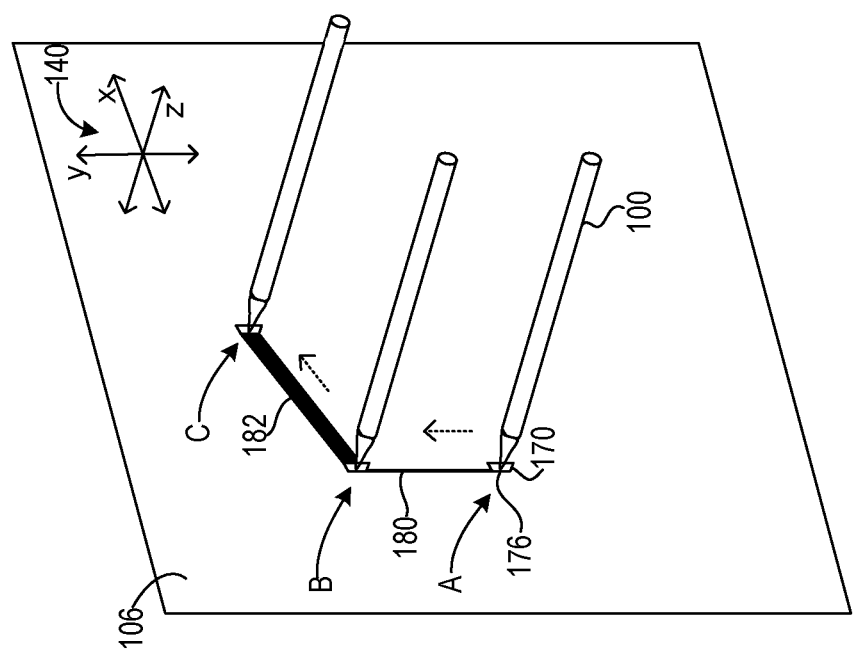
FIG. 11

STYLUS HAPTIC OUTPUT

BACKGROUND

A handheld electronic stylus can be manipulated to provide user interactions to a computing device, such as through contacting a touch-screen display. Some styli provide haptic output to the user in the form of vibrations created in a body of the stylus.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to styli, computing devices, and methods for providing haptic output to a body of a stylus. In one example, a method comprises receiving rotational position data indicating a rotational position of a stylus about a longitudinal axis of the body of the stylus. Travel direction data is received that indicates a direction of travel of a tip of the stylus relative to a touch-sensitive screen of a computing device. Using at least the rotational position data and the travel direction data, one or more characteristics of a drive signal are determined. The drive signal is then transmitted to a haptic feedback mechanism within the body of the stylus to generate the haptic output at the body.

BRIEF DESCRIPTION OF THE DRAWINGS

FIG. 8 shows an example function relating a drive signal amplitude to a travel direction angle of a stylus according to examples of the present disclosure.

FIG. 9 shows the stylus moving in an angled travel direction according to examples of the present disclosure.

FIG. 10 shows a table of angle ranges and corresponding waveforms according to examples of the present disclosure.

FIG. 11 shows a stylus manipulating a virtual tip shape according to examples of the present disclosure.

FIG. 12 shows the virtual tip shape of FIG. 11 according to examples of the present disclosure.

FIG. 13 shows a stylus with a replaceable tip according to examples of the present disclosure.

DETAILED DESCRIPTION

Some electronic styli can provide haptic output to a user in the form of vibration applied to a body of the stylus via an internal motor. The haptic output may be provided for a variety of purposes, including but not limited to simulating a tactile sensation (e.g., resulting from the traversal of a virtual surface such as gravel, or from touching a virtual object), simulating a force, confirming a user input (e.g., in response to user selection of a graphical user interface element), and providing other types of feedback (e.g., an indication of the state of an input device such as a battery level, the state of an application).

In some examples, a user may desire to use a stylus with a display to simulate real world activities that the user might perform with a pencil, highlighter, marker, paint brush, modeling knife, or other tool. In some of these activities, the positioning of the stylus relative to the display surface can create different results that are displayed on the surface, such as thicker and/or darker lines and shadings. In these examples, and in addition to the different visual results of a particular positioning of a virtual tool, it may be desirable to provide the user with different tactile sensations at different positionings. In other examples, it may be desirable to simulate tactile sensations resulting from the traversal of a virtual surface, and to vary such sensations with different positionings of the stylus relative to the contacting surface.

Accordingly, examples are disclosed that relate to providing haptic output to a body of a stylus based on positionings of the stylus relative to a touch-sensitive display screen of a computing device. In one example and as described in more detail below, a stylus receives rotational position data indicating a rotational position of the stylus about a longitudinal axis of the body of the stylus. Travel direction data indicating a direction of travel of the stylus tip relative to the touch-sensitive screen is also received. Using at least the rotational position data and the travel direction data, one or more characteristics of a drive signal are determined. The drive signal is then transmitted to a haptic feedback mechanism within the body of the stylus to apply the haptic output to the body.

Figure 1:
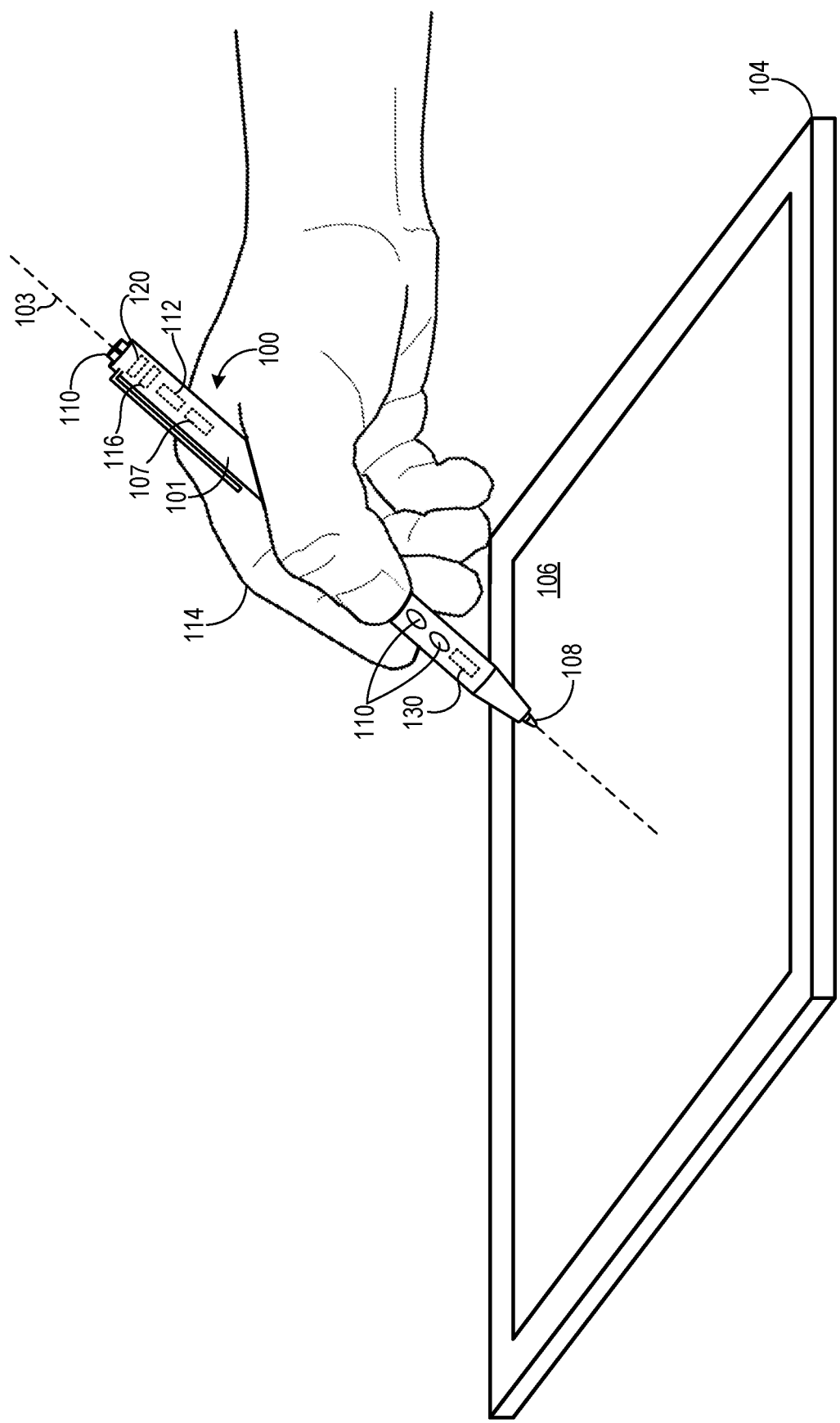
FIG. 1 shows a stylus and computing device with a touch-sensitive display screen according to examples of the present disclosure.
Figure 2:
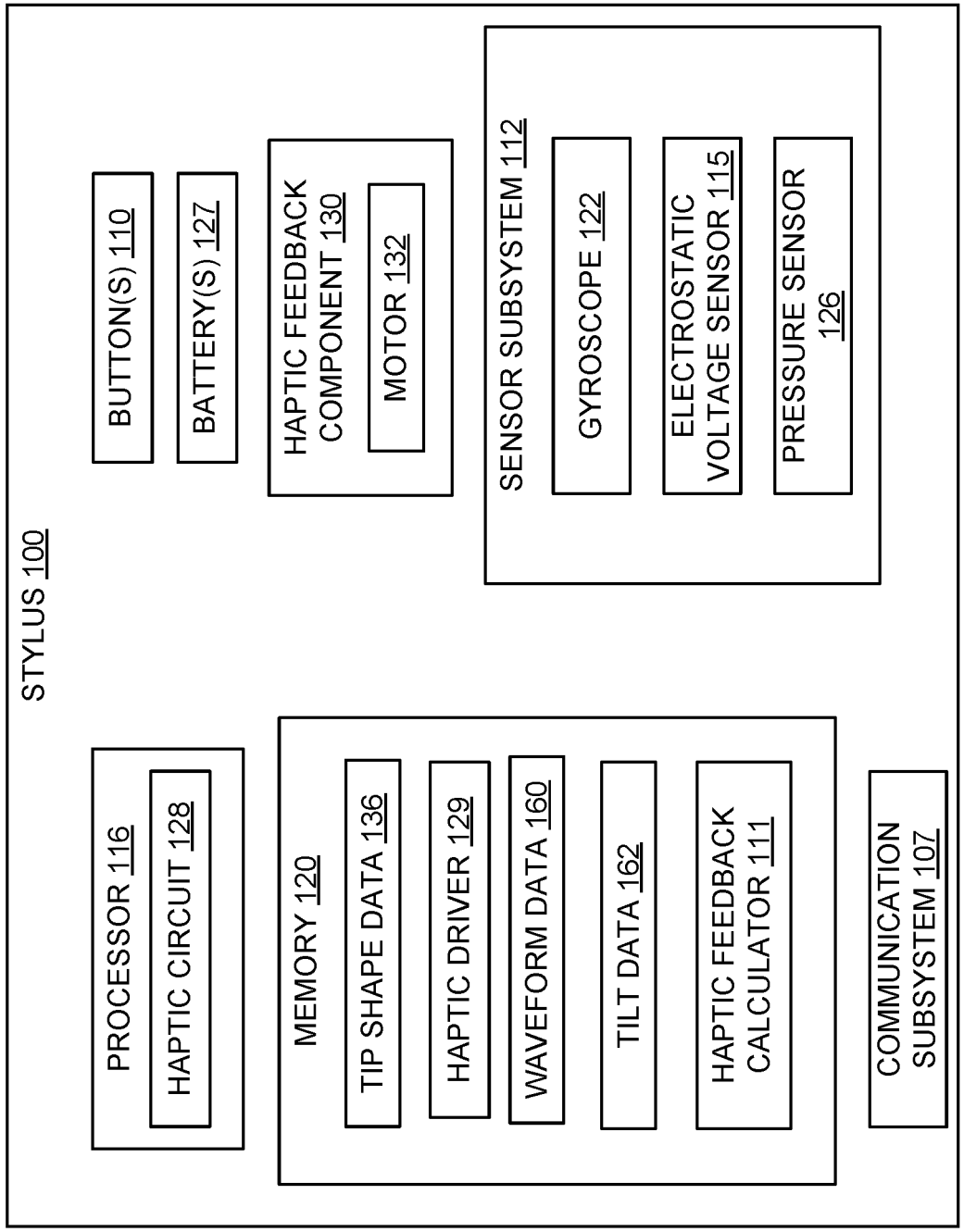
FIG. 2 shows a schematic diagram of components of the stylus of FIG. 1 according to examples of the present disclosure.

With reference now to FIGS. 1 and 2, one example of a stylus 100 according to examples of the present disclosure is depicted. Stylus 100 includes an elongated body 101 that extends along a longitudinal axis 103 and takes the form factor of a pen, though the body may assume other suitable forms. As shown in the depicted example, stylus 100 is operable to provide user input to a computing device 104, such as via a touch-sensitive display screen 106 of the device. Computing device 104 is shown in the form of a mobile computing device (e.g., tablet) but may assume any suitable form. Any suitable type of user input may be provided to computing device 104 using stylus 100. As examples, stylus 100 may be used to write or draw graphical content on the touch-sensitive display screen 106, modify displayed graphical content (e.g., resize, reposition, rotate), erase graphical content, select graphical user interface (GUI) elements, and/or provide gestural input.

In some examples, to enable the provision of user input from stylus 100 to computing device 104, the stylus may include a communication subsystem 107 that can transmit energy and/or data from the stylus to the computing device. For example, the communication subsystem 107 may include a radio transmitter for wirelessly transmitting data to computing device 104 along a radio link. As another example, the communication subsystem 107 alternatively or additionally may include a capacitive transmitter for wirelessly transmitting data to computing device 104 along a capacitive link. The capacitive link may be established between the capacitive transmitter and the touch-sensitive screen 106 having a capacitive touch sensor, for example. In some examples, the stylus 100 may include one or more electrostatic antenna configured to generate electrostatic field(s).

Any suitable data may be transmitted to computing device 104 via the communication subsystem 107, including but not limited to indications of actuations at stylus 100 (e.g., depression of one or more buttons 110), data regarding the position of the stylus relative to the computing device (e.g., one or more coordinates), a power state or battery level of the stylus, and data from one or more sensors on-board the stylus (e.g., gyroscope and/or accelerometer data). In some examples, data regarding the locations of contact points between a user hand 114 and stylus 100 may be transmitted to computing device 104 via the communication subsystem 107.

It will be understood that any suitable mechanism may be used to transmit information from stylus 100 to computing device 104. Additional examples include optical, resistive, and wired mechanisms. In other examples, styli according to the present disclosure do not include a communication subsystem for transmitting energy and/or data from the stylus to a computing device. Additionally and in other examples, the principles of the present disclosure may be utilized with touch screen displays employing other touch detection technologies, including but not limited to resistive touch detection, self-capacitance touch detection, and projected capacitance touch detection.

In some examples of the present disclosure, in addition to or instead of transmitting data to the computing device, a stylus is configured to receive energy and/or data from computing device 104. In the example of FIGS. 1 and 2, stylus 100 includes a sensor subsystem 112 that includes an electrostatic voltage sensor 115 comprising one or more antennas in one or more locations of the body 101, such as at the tip 108 of the stylus. The one or more antennas are configured to receive electrostatic energy signals from the touch-sensitive screen 106 over an electrostatic channel, such as a frequency changing channel. In some examples, these signals are provided by capacitively-coupled currents from electrodes of the touch-sensitive screen 106. These signals are amplified and converted to digital signals for use by a processor 116 of the stylus 100.

In some examples, sensor subsystem 112 can include one or more other sensing components and functionalities, such as accelerometer(s), gyroscope(s), magnetometer(s), inertial measurement unit(s), touch sensor(s) along body 101, stress sensor(s) along body 101, and force (pressure) sensor(s). In the present example, sensor subsystem 112 includes a gyroscope 122 and a pressure sensor 126 at the tip 108 of stylus 100, such as a piezoelectric crystal that provides an output voltage in response to the pressure imposed upon it.

Example hardware, including processor 116, memory 120 and communication subsystem 107, that may be incorporated by stylus 100 to implement the disclosed approaches, is described further below with reference to FIG. 16. In some examples, the processor 116 includes a haptic circuit 128 configured to execute a haptic driver 129 that controls activation of the haptic feedback component 130. Stylus 100 further includes one or more batteries 127 configured to provide power to processor to the various components of the stylus.

As noted above, stylus 100 is configured to provide haptic feedback to users. To this end, stylus 100 includes a haptic feedback component 130 configured to apply haptic output to the body 101. As shown in the example of FIG. 1, haptic feedback component 130 is arranged within body 101 towards the tip 108. In other examples, one or more haptic components may be provided at any suitable location within stylus 100. Haptic feedback component 130 may employ any suitable component(s) to provide haptic feedback as described herein. As one example, haptic feedback component 130 may include a motor 132 that applies haptic output to body 101 in the form of vibration induced in the body. In some examples, multiple haptic feedback components are provided at different locations within a stylus.

As noted above, styli with haptic output functionality can generate haptic output for a variety of purposes and in response to different user activities. Also as noted, and in some example use cases, it would be desirable to provide the user with different tactile sensations at different positionings of the stylus relative to the surface it is contacting. Accordingly, as described in more detail below and in one potential advantage of the present disclosure, styli of the present disclosure may use at least rotational position data and travel direction data of a stylus tip relative to a touch-sensitive screen to determine one or more characteristics of a drive signal. In some examples, other data such as the tip shape of the stylus tip also may be utilized to determine characteristics of the drive signal. The drive signal is then transmitted to a haptic feedback mechanism of the stylus to apply the corresponding haptic output to the body of the stylus.

Figure 3A:
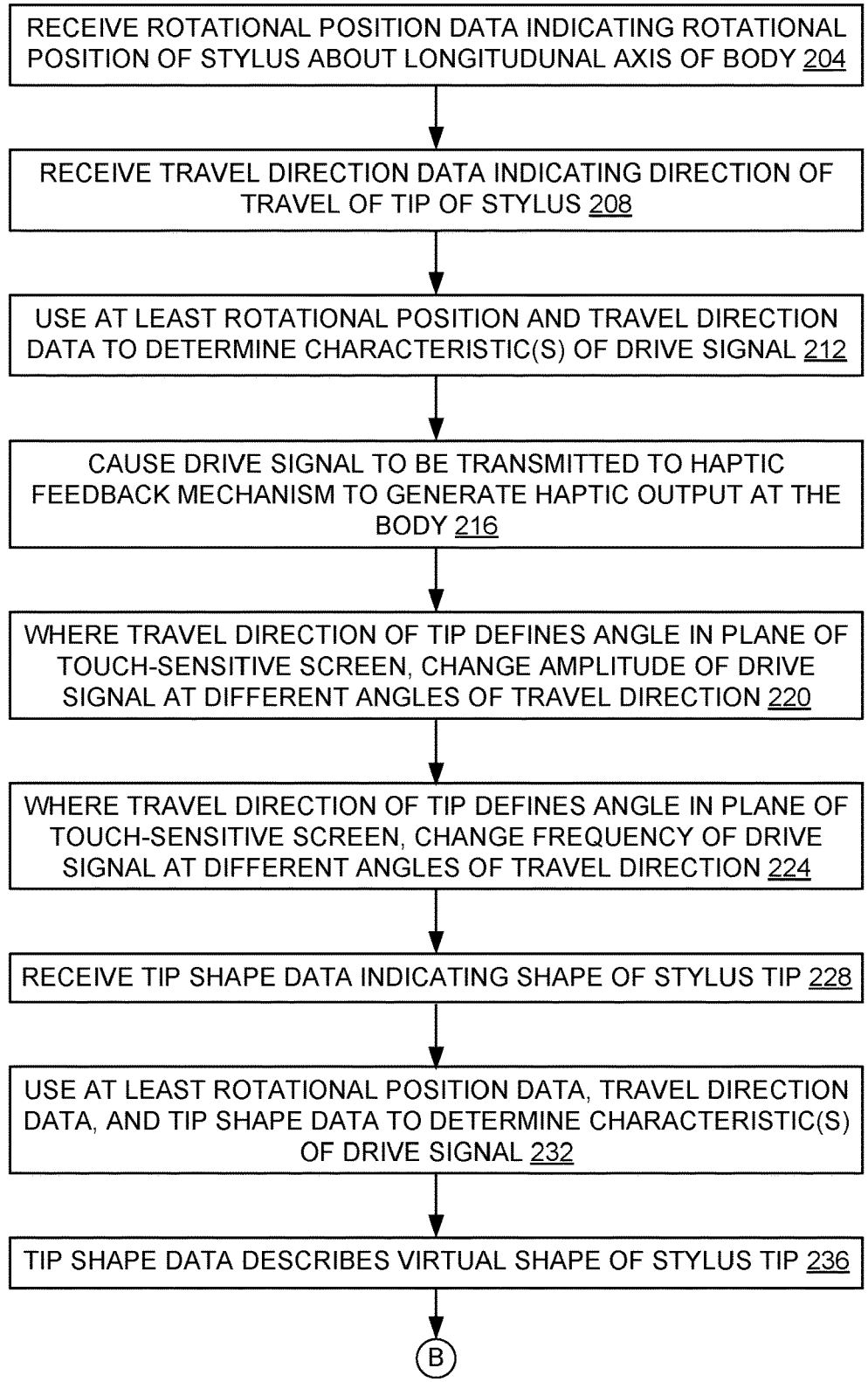
FIGS. 3A-3B show a flowchart illustrating a method for providing haptic output to a body of a stylus according to examples of the present disclosure.
Figure 3B:
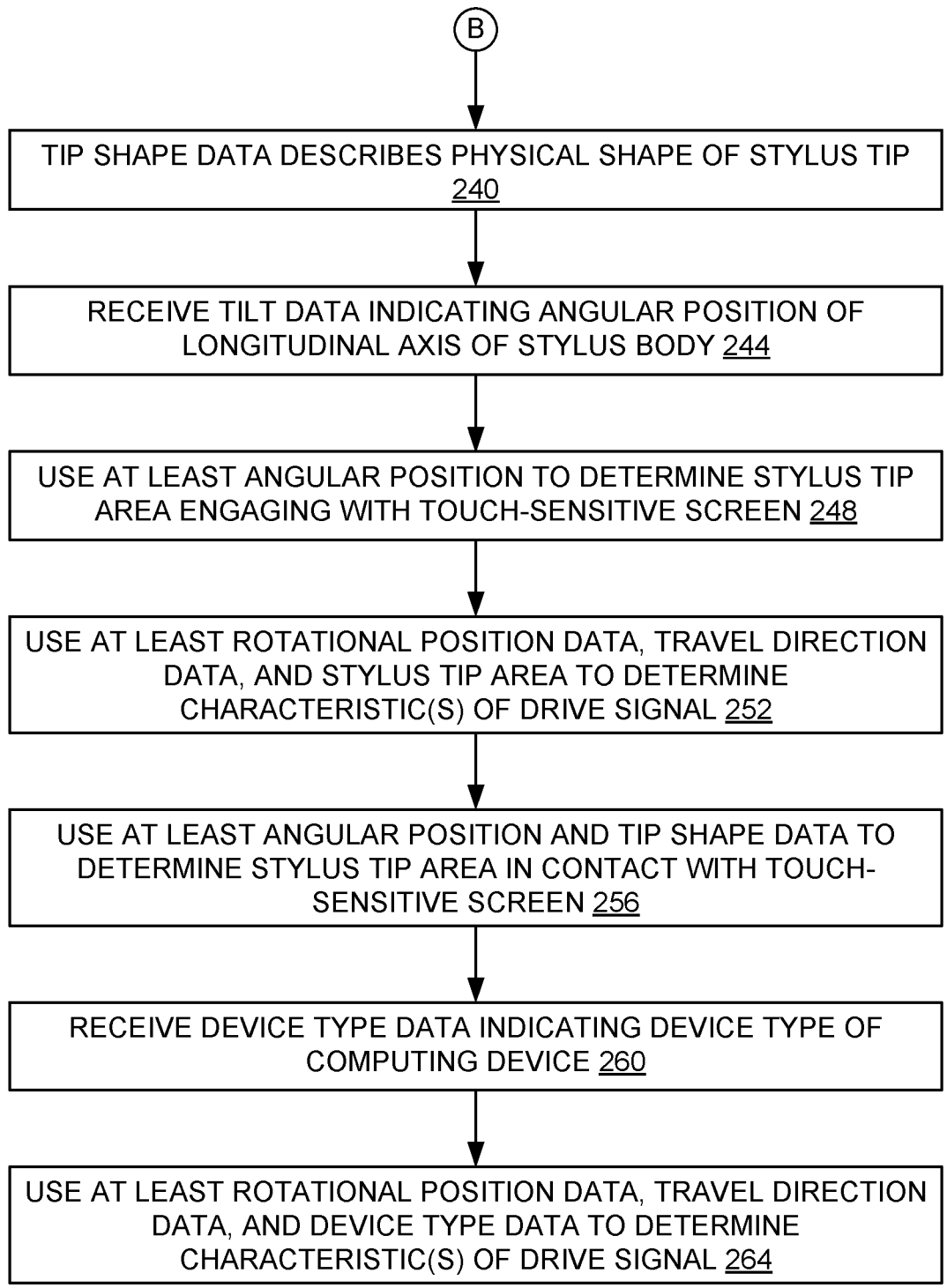

With reference now to FIGS. 3A-3B and 4-16, a method 200 for providing haptic output to a body of a stylus along with corresponding example use cases will now be described. FIGS. 3A-3B depict a flowchart illustrating the method 200. As described in more detail below, in some examples method 200 may be implemented and performed at a stylus, such as stylus 100. In other examples, one or more steps of method 200 may be implemented and performed at a computing device, such as computing device 104.

Figure 5:
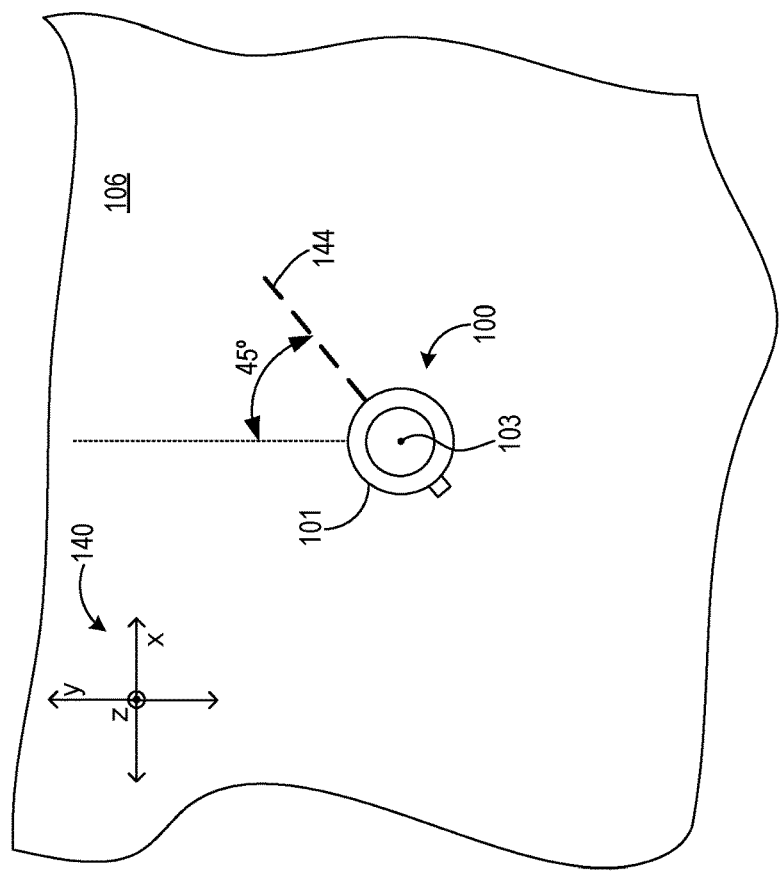
FIGS. 4 and 5 show a stylus in two rotational positions according to examples of the present disclosure.
Figure 4:
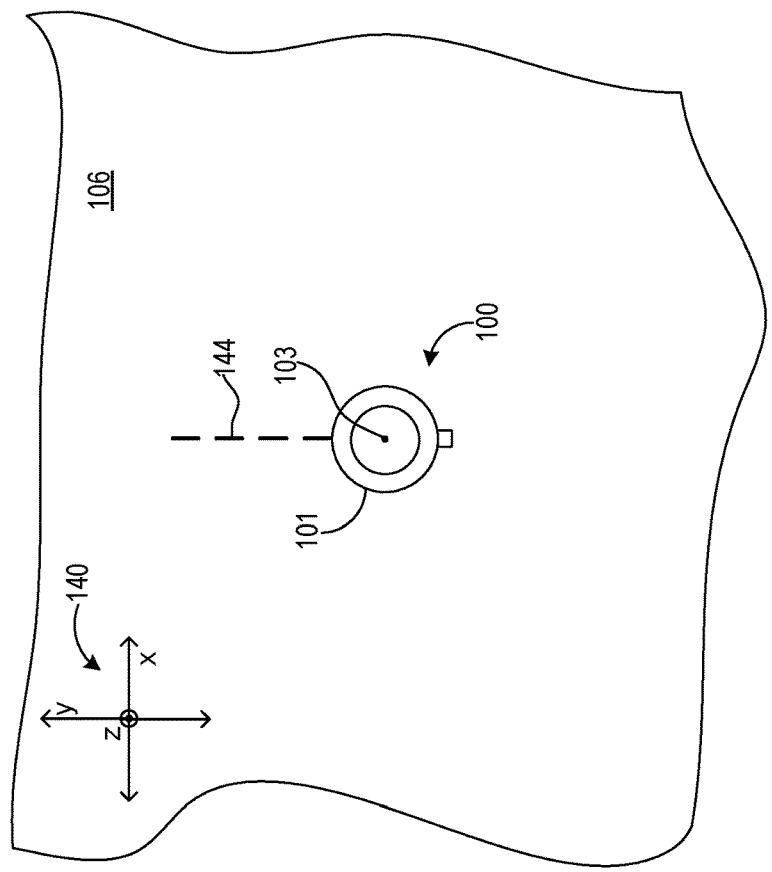

The following description of method 200 is provided by way of example and is not meant to be limiting. Therefore, it is to be understood that method 200 may include additional and/or alternative steps relative to those illustrated in FIGS. 3A-3B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components With reference to FIG. 3A, at 204 the method 200 includes receiving rotational position data indicating a rotational position of the stylus 100 about the longitudinal axis 103 of the body 101 of the stylus 100. In some examples, the rotational position data indicates a rotational position of the stylus 100 about its longitudinal axis 103 relative to the touch-sensitive screen 106 of the computing device 100. With reference now to FIGS. 4 and 5, in one example a screen coordinate system 140 is defined for the touch-sensitive screen 106 in which the x-axis and y-axis are co-planar with the screen surface. FIG. 4 shows an initial rotational position of the stylus 100 in which a lateral stylus axis 144 is parallel to the y-axis of the screen coordinate system 140. In FIG. 5 the stylus 100 has been rotated 45 degrees relative to the touch-sensitive screen 106. As described in more detail below, and in one potential advantage of the present disclosure, the rotational position of stylus 100 can be utilized to determine one or more characteristics of a drive signal that is used to generate haptic output at the stylus.

In some examples, rotational position data of stylus 100 can be determined by the computing device 104. Such rotational position data can be received in memory of the computing device or transmitted to and received by stylus 100. For example, a digitizer in computing device 100 can receive electrostatic signals from one or more electrostatic transmitters in the stylus 100. The digitizer can interpret and utilize these signals to determine a rotational position of the stylus 100 relative to the touch-sensitive screen 106. In other examples, and in addition to or instead of electrostatic signal(s), one or more other signals from the stylus may be utilized by the digitizer to determine the stylus' rotational position. For example, a gyroscope 122 in stylus 100 may generate rotation data that is transmitted to computing device 100. A digitizer in computing device 100 may then utilize this data to determine the rotational position of stylus 100 relative to the touch-sensitive screen 106. In other examples, any suitable techniques for determining the rotational position of stylus 100 relative to the touch-sensitive screen 106 may be utilized.

Figure 6:
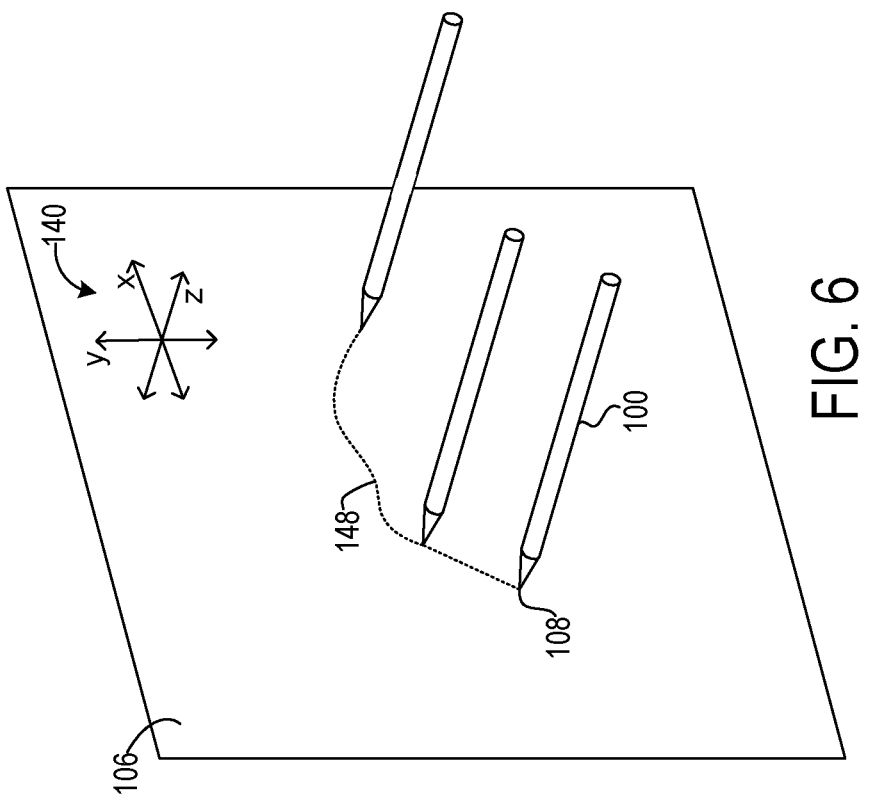
FIG. 6 shows the tip of the stylus traversing the touch-sensitive screen according to examples of the present disclosure.

With reference again to FIG. 3A, at 208 the method 200 includes receiving travel direction data indicating a direction of travel of the tip 108 of the stylus 100 relative to the touch-sensitive screen 106. With reference now to FIG. 6, one example of the tip 108 of stylus 100 traversing the touch-sensitive screen 106 in the x-y plane of the screen is illustrated. In this example, the tip 108 of stylus 100 traces a path 148 across a portion of the touch-sensitive screen 106.

In different examples, travel direction data of the tip 108 of stylus 100 can be determined by the computing device 104 and either received in memory of the computing device or transmitted to and received by stylus 100. For example, the touch-sensitive screen 106 may comprise a mutual capacitance touch screen display. In these examples, touch inputs are identified by sampling capacitance between a driving electrode and a sensing electrode in the display. Driving and sensing electrodes are arranged in an array within the touch screen display. Signals are provided to each of the driving electrodes at a different frequency and/or at a different time.

Conductive materials, such as a stylus tip 108, draw current away from the driving electrodes when positioned near or in contact with the touch-sensitive screen 106. The touch input can be identified by detecting this current, and locations of such inputs can be reconstructed based on determining which driving electrodes were being driven when the inputs occurred, and the frequency of the signal driving each driving electrode. Detecting this current also includes detecting the current flow into various sensing electrodes that results from the increased capacitive coupling between the driving electrodes and the sensing electrodes caused by the stylus tip 108 or other conductive object providing the touch input. In this manner, the locations of inputs corresponding to the travel direction of stylus tip 108 can be determined, where such location data corresponds to the travel direction data of the tip relative to the touch-sensitive screen 106.

In some examples, the travel direction data comprises velocities of the stylus tip 108 relative to the touch-sensitive surface, such as velocities in the x-axis and the y-axis directions. In different examples, travel direction data may be transmitted from the computing device 104 to the stylus 100 via electrostatic signals, radio signals (such as Bluetooth), or any other suitable transmission medium.

With reference again to FIG. 3A, at 212 the method 200 includes using at least the rotational position data and the travel direction data to determine one or more characteristics of a drive signal. And at 216 the method 200 includes causing the drive signal to be transmitted to a haptic feedback mechanism within the body of the stylus to generate corresponding haptic output at the body. In one example and with reference to FIG. 7, a user may use the stylus 100 to control the orientation and movement of an icon 150 displayed by the touch-sensitive screen 106. In this example, as the icon 150 traverses one or more displayed lines 152, the stylus 100 generates haptic output to simulate a tactile sensation of the icon traveling over one or more bumps. Using the locations of the lines 152 on the touch-sensitive screen 106, the stylus' rotational position data, and the stylus tip travel direction data, one or more characteristics of a drive signal to generate a desired haptic output can be determined based on the number of lines 152 the icon 150 is crossing.

Figure 7:
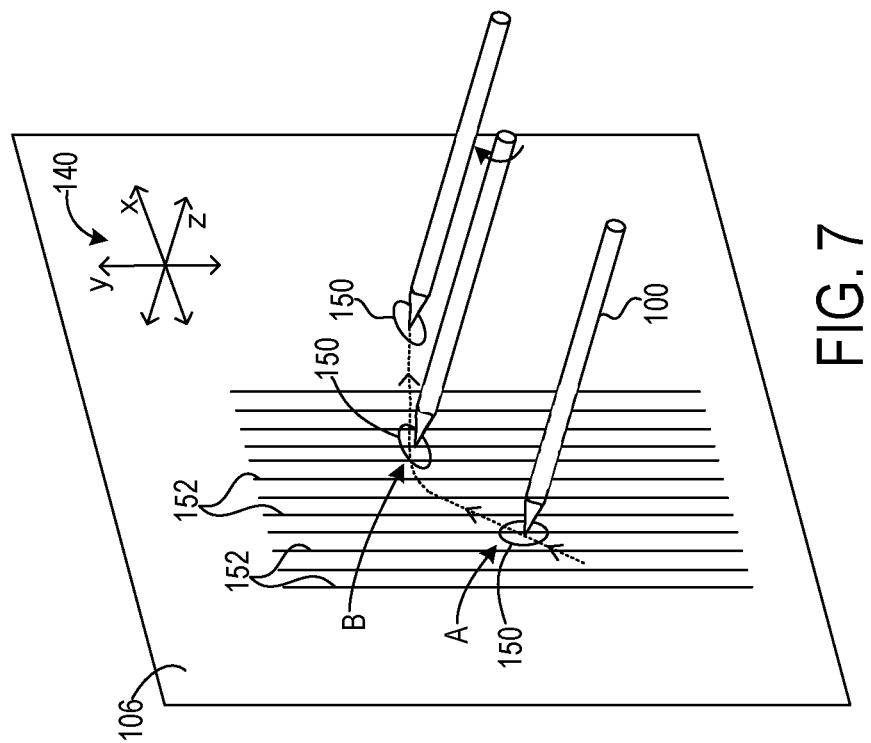
FIG. 7 shows another example of the stylus tip traversing the touch-sensitive screen according to examples of the present disclosure.

For example, each line 152 may correspond to a predetermined magnitude X of vibration to be generated by the haptic feedback component 130 when icon 150 traverses a line. In the example of FIG. 7 and at position A, stylus tip 108 and icon 150 are moving in an upwardly angled travel direction as indicated, and the rotational position of stylus 100 causes icon 150 to be oriented in an upright position as illustrated. Accordingly, at position A the icon 150 is traversing a single line 152. Using this travel direction data and rotational position data, a drive signal is determined that will generate haptic output having magnitude X, and the stylus transmits the drive signal to the haptic feedback mechanism 130 to generate this selected haptic output at the body 101 of the stylus 100.

As the user moves the stylus 100 and icon 150 to position B, the user also rotates the stylus in a clockwise direction to cause the icon 150 to correspondingly rotate to the orientation as shown. At position B stylus tip 108 and icon 150 have changed directions and are moving in a slightly downwardly-angled travel direction as indicated. Accordingly, at position B the icon 150 is traversing three lines 152. Using this travel direction data and rotational position data, a different drive signal is determined and selected that will generate haptic output having magnitude 3X (corresponding to three lines 152), and the stylus transmits this drive signal to the haptic feedback mechanism 130 to generate this selected haptic output at the body 101 of the stylus 100 at this position. Advantageously and in this manner, the stylus travel direction data and rotational position data are utilized to provide customized and realistic haptic output to the user that would otherwise be unavailable by utilizing just one of these data types.

In different examples, the rotational position and travel direction of a stylus may be used to determine a variety of characteristics of a drive signal and corresponding haptic output. Such characteristics may include, but are not limited to, magnitude and frequency. In some examples, waveform data 160 corresponding to different drive signals for the haptic feedback mechanism 130 may be stored in memory 120 of the stylus 100. In some examples, the rotational position data and travel direction data may be utilized by the stylus 100 to determine and select a corresponding waveform from memory 120. In some examples, the rotational position data and travel direction data may be utilized by the stylus 100 to calculate a corresponding waveform. For example, waveform data 160 for a plurality of waveforms along with corresponding rotational position and travel direction data values may be stored in a lookup table, and a haptic feedback calculator 111 may utilize currently-measured rotational position data and travel direction data to determine a corresponding waveform. As noted above, and in one potential technical benefit of the present disclosure, by combining and utilizing both stylus travel direction data and rotational position data, particular waveforms may be selected and/or calculated to generate customized and realistic haptic output.

In other examples, waveform data may be stored in memory of the computing device 104 and transmitted to the stylus 100 as needed. In some examples, the computing device 104 may calculate a waveform as a function of the rotational position data and travel direction data and transmit the waveform to the stylus 100, such as by referencing a lookup table as described above.

In some examples, the travel direction of the tip 108 of stylus 100 defines an angle in the x-y plane of the touch-sensitive screen 106 relative to the screen coordinate system 140. With reference again to FIG. 3A and at 220, the method 200 may include changing an amplitude of the drive signal at different angles of the travel direction in the x-y plane of the touch-sensitive screen relative to the screen coordinate system. With reference to FIGS. 8 and 9 and in one example, the angle of the travel direction of tip 108 is defined as the angle with respect to the y-axis of the screen coordinate system 140. As shown in FIG. 8, in this example the amplitude of the drive signal can vary between a minimum scaled value of 1 to a maximum scaled value of 10. In this example the amplitude of the drive signal is linearly proportional to the angle of the travel direction between the minimum amplitude at zero degrees (parallel to y-axis) and the maximum amplitude at 90 degrees (perpendicular to the y-axis). When the travel direction has a negative y-axis component, the angle of the travel direction may be measured with respect to the negative y-axis.

In the example of FIG. 9, the stylus 100 is moving in a travel direction that is angled 30 degrees with respect to the y-axis. Accordingly, and with reference to FIG. 8, the corresponding amplitude of the drive signal is 3.5. As the travel direction of the stylus changes, the amplitude of the drive signal correspondingly changes according to the function of FIG. 8. In other examples, a variety of other linear and non-linear functions defining the relationship between the travel direction and the amplitude of the drive signal may be utilized. In different examples, these functions may be stored in a lookup table in memory 120 of stylus 100 or memory of computing device 104. Advantageously, and in combination with the rotational position data as described above, in these examples the haptic output of stylus 100 is tailored to reflect the travel direction of the stylus. In some examples, other characteristics of the drive signal waveform remain constant regardless of the travel direction of the stylus.

In some examples, one or more different characteristics of a drive signal waveform may be changed at different angles of the travel direction. For example and with reference again to FIG. 3A, where the travel direction of the tip 108 of stylus 100 defines an angle in the x-y plane of the touch-sensitive screen 106 relative to the screen coordinate system 140, at 224 the method 200 comprises changing a frequency of the drive signal at different angles of the travel direction in the x-y plane of the touch-sensitive screen relative to the screen coordinate system. In some examples and as described above, the angle of the travel direction of tip 108 is defined as the angle with respect to the y-axis of the screen coordinate system 140. A plurality of angle ranges may be defined that each correspond to a different waveform having a different frequency. In some examples, two or more angle ranges may correspond to the same frequency. Any desired range of angles may be utilized. In one example and with reference to FIG. 10, angle ranges of 5 degrees between zero and 90 degrees may be utilized, with each 5-degree range corresponding to a waveform having a different frequency.

With reference again to the example of FIG. 9, as the stylus 100 is moving in a travel direction that is angled 30 degrees with respect to the y-axis, the corresponding waveform from the table of FIG. 10 is Waveform F. As the travel direction of the stylus moves into different angle ranges, different waveforms are utilized according to the lookup table of FIG. 10. As with the examples discussed above, in different examples these angle ranges and corresponding waveforms may be stored in a lookup table in memory 120 of stylus 100 or memory of computing device 104. Advantageously, in these examples the haptic output of stylus 100 may be further tailored according to the travel direction of the stylus.

In some examples and as described in more detail below, tip shape data 136 indicating a virtual or actual shape of the tip 108 of the stylus 100 may be utilized with rotational position data and travel direction data to determine and deliver a selected haptic output. With reference again to FIG. 3A, at 228 the method 200 may include receiving tip shape data 136 indicating a shape of the tip 108 of the stylus 100. At 232 the method 200 may include using at least the rotational position data, the travel direction data, and the tip shape data to determine one or more characteristics of a drive signal to be provided to the haptic feedback mechanism 130.

In some examples and at 236 the method 200 includes receiving tip shape data 136 that describes a virtual shape of the tip 108 of the stylus 100. In some examples, a user may select different virtual tip shapes for stylus 100 that produce different displayed output on the touch-sensitive display. For example, a user may select a virtual ballpoint pen shape to generate ("draw") thin lines on the touch-sensitive screen 106. In some examples a virtual tip shape may be symmetrical, such as a round ballpoint pen shape that produces a circular mark on the display. In these examples, when the tip 108 of stylus 100 is moved along the surface of the touch-sensitive screen 106, the width and shape of the resulting displayed output (in the x-y plane of the display) may be unaffected by the rotational position and the travel direction of the stylus.

In other examples, a virtual tip shape may be asymmetrical, such as a chisel, razor, or marker shape. With an asymmetrical tip shape, when the tip 108 of stylus 100 is moved along the surface of the touch-sensitive screen 106, the width and/or shape of the resulting displayed output (in the x-y plane of the display) is dependent upon the rotational position and the travel direction of the stylus. In these examples, it may be desirable to provide varying haptic feedback that corresponds to the rotational position and/or travel direction of the stylus 100. Accordingly, and in another potential technical benefit of the present disclosure, by combining and utilizing stylus travel direction data, rotational position data, and tip shape data, varying waveforms may be selected and/or calculated to generate customized and realistic haptic output.

With reference now to FIGS. 11 and 12, one example showing a virtual chisel tip shape 170 is illustrated. In this example, the virtual chisel tip shape 170 includes two angled side surfaces 172 and 174 that converge to define an edge 176. As shown in FIG. 11, in this example at position A the rotational position of stylus 100 causes the edge 176 of virtual chisel shape 170 to be aligned with the y-axis of the screen coordinate system 140. As the stylus 100 is moved vertically along the y-axis direction from position A to position B, a relatively thin line 180 is displayed corresponding to the movement of the edge 176 in a direction parallel to the length of the edge. To provide the user with a tactile experience of creating this line, which may simulate drawing on paper, gouging or removing material from a surface, or another experience, the stylus uses the rotational position data, travel direction data, and virtual chisel shape data to determine one or more characteristics of a drive signal that will generate a selected haptic output that simulates the tactile experience. The drive signal is then transmitted to the haptic feedback mechanism 130 as described above.

At position B, the user changes the travel direction of the stylus 100 to move laterally as indicated. As the stylus 100 is moved at least partially in the x-axis direction from position B to position C, a thicker line 182 is displayed corresponding to the movement of the edge 176 in a direction that is not parallel to the length of the edge. In this example, the thickness of the line 182 corresponds to the length of the edge 176 of the virtual chisel shape 170.

To provide the user with a different tactile experience that simulates creating this thicker line, the stylus 100 uses the rotational position data, travel direction data, and virtual chisel shape data to determine one or more characteristics of a different drive signal to produce a different haptic output, such as a higher magnitude vibration to simulate greater friction. In one example, a waveform having a greater amplitude is selected for the drive signal that is transmitted to the haptic feedback mechanism 130, thereby generating a more pronounced vibration in the stylus 100 as compared to the vibration generated by the haptic output corresponding to line 180. In other examples, in addition to or instead of a greater amplitude, a waveform having a different frequency as compared to the waveform used for line 180 may be selected. In different examples, the virtual chisel shape 170 may or may not be displayed to a user.

With reference now to FIG. 3B, in some examples and at 240 the method 200 includes receiving tip shape data 136 that describes an actual physical shape of the tip of a stylus. As with the virtual tip shape examples described above, the stylus may use the rotational position data, travel direction data, and actual tip shape data to determine one or more characteristics of a drive signal, and then generate the corresponding haptic output at the body of the stylus as described above. In one example and as shown in FIG. 13, stylus 100 may comprise a replaceable tip 109 that has a chisel shape 111 similar to the virtual chisel shape 170 described above. In other examples, a variety of different replaceable physical tips having symmetrical and asymmetrical shapes may be utilized.

With reference again to FIG. 3B, in some examples and at 244 the method 200 includes receiving tilt data 162 indicating an angular position of the longitudinal axis 103 of the body 101 of stylus 100 relative to a plane of the touch-sensitive screen. At 248 the method 200 includes using at least the angular position of the stylus to determine an area of the stylus tip that is engaging with the touch-sensitive screen 106. And at 252 the method 200 includes using at least the rotational position data, the travel direction data, and the stylus tip area to determine one or more characteristics of the drive signal.

Figure 14:
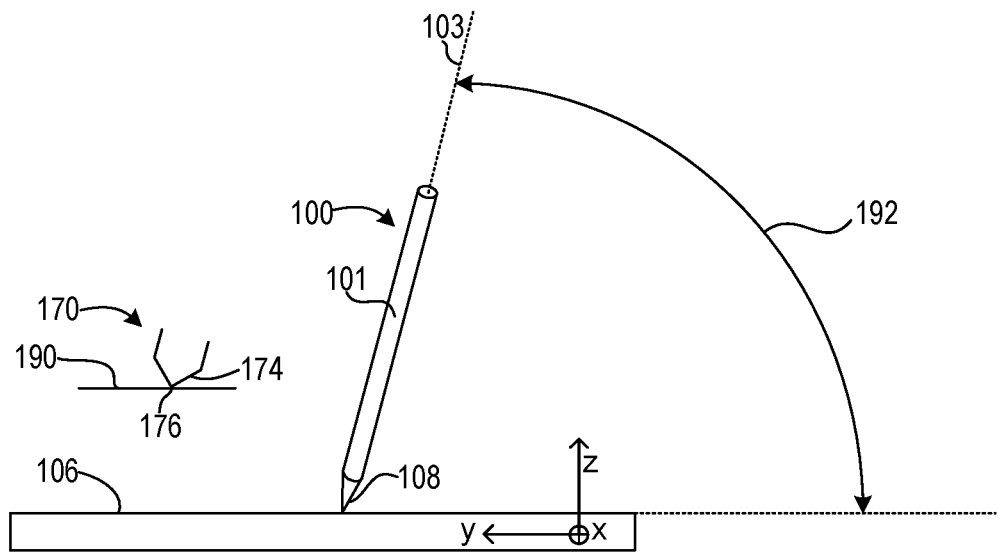
FIG. 14 shows a stylus at a first angular position relative to the touch-sensitive screen according to examples of the present disclosure.
Figure 15:
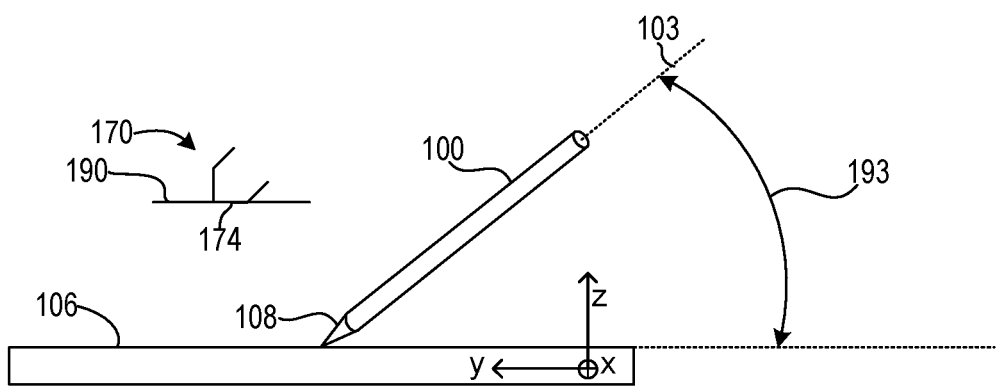
FIG. 15 shows the stylus of FIG. 14 at a second angular position relative to the touch-sensitive screen according to examples of the present disclosure.

In one example and with reference to FIGS. 14 and 15, stylus 100 is configured to control virtual chisel tip shape 170 that is schematically illustrated with respect to a virtual display surface 190. In FIG. 14, an angular position 192 of the longitudinal axis 103 of the body 101 of stylus 100 relative to the x-y plane of the touch-sensitive screen 106 is determined. The angular position 192 may be determined in any suitable manner. In some examples, electrostatic signals from the stylus 100 are received at touch-sensitive screen 106 and analyzed by computing device 104 to determine the tilt and/or azimuth of the stylus 100 relative to the display. In some examples, output from one or more sensors of the stylus may be utilized to determine the tilt and/or azimuth of the stylus 100.

The angular position 192 may then be used to determine a stylus tip area of the virtual chisel tip shape 170 that is engaging with the virtual display surface 190. In some examples tip shape data also may be used to determine the stylus tip area. With reference again to FIG. 3B, at 256 the method 200 includes using at least the angular position and the tip shape data to determine the stylus tip area that is engaging with the touch-sensitive screen 106. In the present example in which a virtual tip shape is utilized, the stylus tip area that is engaging with the touch-sensitive screen 106 is defined as the stylus tip area of virtual chisel tip shape 170 that is engaging with the virtual display surface 190.

In the present example and with reference to FIG. 14, using the angular position 192 of the stylus 100 and tip shape data describing the shape and dimensions of the virtual chisel tip shape 170, stylus 100 determines a stylus tip area of the virtual chisel tip shape 170 that is engaging with the virtual display surface 190 (simulating touch-sensitive screen 106). In this example, the stylus tip area is the relatively narrow area of the virtual display surface 190 "contacted" by the edge 176 of the virtual chisel tip shape 170. The determined stylus tip area, the rotational position data, and the travel direction data of the stylus 100 are then used to determine one or more characteristics of the drive signal to generate haptic output, such as a relatively smaller magnitude of vibration to simulate the relatively narrow area of virtual contact between the edge 176 of the virtual chisel tip shape 170 and the virtual display surface 190. Accordingly, and in another potential technical benefit of the present disclosure, by combining and utilizing stylus angular position data and tip shape data to determine a stylus tip area that is engaging with the virtual display surface 190, and then utilizing the tip area, rotational position data, and travel direction data to determine characteristic(s) of the drive signal, customized and realistic haptic output may be provided.

With reference now to FIG. 15, in this example the user has tilted the stylus 100 toward the touch-sensitive screen 106 to a narrower angular position 193 relative to the display. In this position, the angled side surface 174 of the virtual chisel tip shape 170 is now contacting the virtual display surface 190. In one example, the user may tilt the stylus 100 in this manner to perform a "shading" operation similar to tilting and moving a drawing pencil back and forth on paper or other medium.

Using this angular position 193 of the stylus 100 and data describing the shape and dimensions of the virtual chisel tip shape 170, stylus 100 determines a stylus tip area of the virtual chisel tip shape 170 that is engaging with the virtual display surface 190. In this example, the stylus tip area is the rectangular area of the angled side surface 174 (see also FIG. 12). The determined stylus tip area, the rotational position data, and the travel direction data of the stylus 100 are then used to determine one or more characteristics of a drive signal to produce a different haptic output, such as a relatively larger magnitude of vibration to simulate the relatively wider/larger area of virtual contact between the angled side surface 174 of the virtual chisel tip shape 170 and the virtual display surface 190.

In other examples and using the foregoing techniques, the stylus tip area of an actual physical tip of a stylus that is that is contacting the touch-sensitive screen 106 may be determined using the angular position of the stylus along with data describing the shape and dimensions of the actual physical tip shape. In these examples and as described above, the determined stylus tip area, the rotational position data, and the travel direction data of the stylus are then used to determine one or more characteristics of a drive signal.

In some examples, when the stylus 100 is used with different types of computing devices, the stylus may generate different haptic outputs depending upon the type of device with which it is used. For example and with reference again to FIG. 3B, at 260 the method 200 may include receiving device type data indicating a device type of the computing device. At 264 the method 200 may include using at least the rotational position data, the travel direction data, and the device type data to determine one or more characteristics of a drive signal.

For example, and with respect to a tablet computing device such as computing device 104, movement of the stylus 100 in the y-axis direction relative to the touch-sensitive screen 106 may cause the stylus to utilize a first drive signal having a first frequency that generates a first haptic output. When the stylus 100 is used with a different type of computing device, such as a large format interactive whiteboard, movement of the stylus 100 in the same y-axis direction with respect to the whiteboard causes the stylus to utilize a second, different drive signal having a second frequency that generates a second, different haptic output. In this manner, stylus haptic output may be customized to provide different tactile sensations based on the type of computing device with which it is being used.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
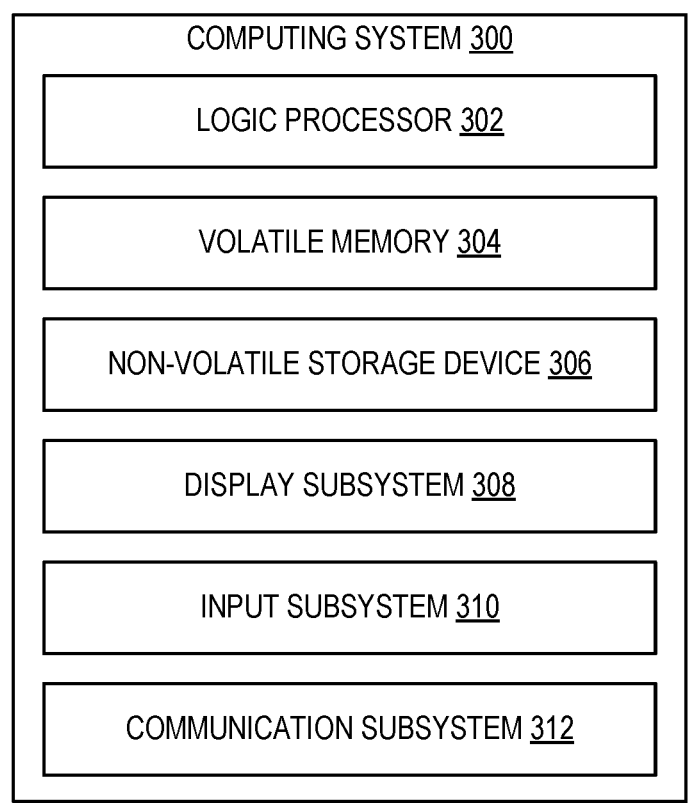
FIG. 16 schematically depicts an example computing system.

FIG. 16 schematically shows a non-limiting embodiment of a computing system 300 that can enact one or more of the methods and processes described above. Computing system 300 is shown in simplified form. Computing system 300 may embody the computing device 104 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. One or more aspects of computing system 300 may be utilized in stylus 100.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 16.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a stylus, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless personal-, local-, or wide-area network, such as Bluetooth or an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a method for providing haptic output to a body of a stylus, the method comprising: receiving rotational position data indicating a rotational position of the stylus about a longitudinal axis of the body of the stylus; receiving travel direction data indicating a direction of travel of a tip of the stylus relative to a touch-sensitive screen of a computing device; using at least the rotational position data and the travel direction data to determine one or more characteristics of a drive signal; and causing the drive signal to be transmitted to a haptic feedback mechanism within the body of the stylus to generate the haptic output at the body. The method may additionally or alternative include receiving tip shape data indicating a shape of the tip of the stylus; and using at least the rotational position data, the travel direction data, and the tip shape data to determine the one or more characteristics of the drive signal. The method may additionally or alternative include, wherein the tip shape data describes a virtual shape of the tip of the stylus. The method may additionally or alternative include, wherein the tip shape data describes a physical shape of the tip of the stylus. The method may additionally or alternative include receiving tilt data indicating an angular position of the longitudinal axis of the body of the stylus relative to a plane of the touch-sensitive screen; using at least the angular position of the stylus to determine a stylus tip area that is engaging with the touch-sensitive screen; and using at least the rotational position data, the travel direction data, and the stylus tip area to determine the one or more characteristics of the drive signal.

The method may additionally or alternative include receiving tip shape data indicating a shape of the tip of the stylus; and using at least the angular position of the stylus and the tip shape data to determine the stylus tip area that is engaging with the touch-sensitive screen. The method may additionally or alternative include receiving device type data indicating a device type of the computing device; and using at least the rotational position data, the travel direction data, and the device type data to determine one or more characteristics of the drive signal. The method may additionally or alternative include, wherein the travel direction of the tip defines an angle in a plane of the touch-sensitive screen relative to a screen coordinate system, the method further comprising changing an amplitude of the drive signal at different angles of the travel direction in the plane of the touch-sensitive screen. The method may additionally or alternative include, wherein the travel direction of the tip defines an angle in a plane of the touch-sensitive screen relative to a screen coordinate system, the method further comprising changing a frequency of the drive signal at different angles of the travel direction in the plane of the touch-sensitive screen.

Another aspect provides a stylus for providing input to a touch-sensitive screen of a computing device, the stylus comprising: a body; a haptic feedback mechanism within the body; a logic processor; and a memory storing instructions executable by the processor to provide haptic output to the body via the haptic feedback mechanism, the instructions executable to: receive rotational position data indicating a rotational position of the stylus about a longitudinal axis of the body of the stylus; receive travel direction data indicating a direction of travel of a tip of the stylus relative to the touch-sensitive screen; use at least the rotational position data and the travel direction data to determine one or more characteristics of a drive signal; and cause the drive signal to be transmitted to the haptic feedback mechanism to generate the haptic output at the body of the stylus. The stylus may additionally or alternatively include, wherein the instructions are executable to: receive tip shape data indicating a shape of the tip of the stylus; and use at least the rotational position data, the travel direction data, and the tip shape data to determine the one or more characteristics of the drive signal. The stylus may additionally or alternatively include, wherein the tip shape data describes a virtual shape of the tip of the stylus. The stylus may additionally or alternatively include, wherein the tip shape data describes a physical shape of the tip of the stylus. The stylus may additionally or alternatively include, wherein the instructions are executable to: receive tilt data indicating an angular position of the longitudinal axis of the body of the stylus relative to a plane of the touch-sensitive screen; use at least the tilt data to determine a tip area of the tip that is in contact with the touch-sensitive screen; and use at least the rotational position data, the travel direction data, and the tip area to determine the one or more characteristics of the drive signal.

The stylus may additionally or alternatively include, wherein the instructions are executable to: receive tip shape data indicating a shape of the tip of the stylus; and use at least the tilt data and the tip shape data to determine the tip area of the tip that is in contact with the touch-sensitive screen. The stylus may additionally or alternatively include, wherein the instructions are executable to: receive device type data indicating a device type of the computing device; and use at least the rotational position data, the travel direction data, and the device type data to determine one or more characteristics of the drive signal. The stylus may additionally or alternatively include, wherein the travel direction of the tip defines an angle in a plane of the touch-sensitive screen relative to a screen coordinate system, and the instructions are executable to change an amplitude of the drive signal at different angles of the travel direction in the plane of the touch-sensitive screen. The stylus may additionally or alternatively include, wherein the travel direction of the tip defines an angle in a plane of the touch-sensitive screen relative to a screen coordinate system, and the instructions are executable to change a frequency of the drive signal at different angles of the travel direction in the plane of the touch-sensitive screen.

Another aspect provides a computing device in a stylus for providing input to a touch-sensitive screen of another computing device, the computing device in the stylus comprising: a logic processor; and memory storing instructions executable by the processor to provide haptic output to a body of the stylus, the instructions executable to: receive rotational position data indicating a rotational position of the stylus about a longitudinal axis of the body of the stylus; receive travel direction data indicating a direction of travel of a tip of the stylus relative to the touch-sensitive screen; use at least the rotational position data and the travel direction data to determine one or more characteristics of a drive signal; and cause the drive signal to be transmitted to a haptic feedback mechanism within the body of the stylus to generate the haptic output at the body. The computing device may additionally or alternatively include, wherein the instructions are executable to: receive tip shape data indicating a shape of the tip of the stylus; and use at least the rotational position data, the travel direction data, and the tip shape data to determine the one or more characteristics of the drive signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing haptic output to a body of a stylus, the method comprising:
   receiving rotational position data indicating a rotational position of the stylus about a longitudinal axis of the body of the stylus;
   receiving travel direction data indicating a direction of travel of a tip of the stylus relative to a touch-sensitive screen of a computing device;
   receiving first device type data indicating a first device type of the computing device;
   using at least the rotational position data, the first device type data, and the travel direction data to determine one or more characteristics of a first drive signal;
   causing the first drive signal to be transmitted to a haptic feedback mechanism within the body of the stylus to generate first haptic output at the body;
   receiving second device type data indicating a second device type of the computing device different from the first device type;
   using at least the rotational position data, the second device type data, and the travel direction data to determine one or more characteristics of a second drive signal different from the first drive signal;
   causing the second drive signal to be transmitted to the haptic feedback mechanism within the body of the stylus to generate second haptic output at the body different from the first haptic output; and
   causing the second haptic output at the body to provide a second tactile sensation different from a first tactile sensation caused by the first haptic output.

2. The method of claim 1, further comprising:
   receiving tip shape data indicating a shape of the tip of the stylus; and
   using at least the rotational position data, the travel direction data, the first device type data, and the tip shape data to determine the one or more characteristics of the first drive signal.

3. The method of claim 2, wherein the tip shape data describes a virtual shape of the tip of the stylus.

4. The method of claim 2, wherein the tip shape data describes a physical shape of the tip of the stylus.

5. The method of claim 1, further comprising:
   receiving tilt data indicating an angular position of the longitudinal axis of the body of the stylus relative to a plane of the touch-sensitive screen;
   using at least the angular position of the stylus to determine a stylus tip area that is engaging with the touch-sensitive screen; and
   using at least the rotational position data, the travel direction data, the first device type data, and the stylus tip area to determine the one or more characteristics of the first drive signal.

6. The method of claim 5, further comprising:
   receiving tip shape data indicating a shape of the tip of the stylus; and using at least the angular position of the stylus and the tip shape data to determine the stylus tip area that is engaging with the touch-sensitive screen.

7. The method of claim 1, wherein the travel direction of the tip defines an angle in a plane of the touch-sensitive screen relative to a screen coordinate system, the method further comprising changing an amplitude of the first drive signal at different angles of the travel direction in the plane of the touch-sensitive screen.

8. The method of claim 1, wherein the travel direction of the tip defines an angle in a plane of the touch-sensitive screen relative to a screen coordinate system, the method further comprising changing a frequency of the first drive signal at different angles of the travel direction in the plane of the touch-sensitive screen.

9. The method of claim 1, wherein receiving the first device type data comprises receiving an indication that the computing device is a tablet computing device, and wherein receiving the second device type data comprises receiving an indication that the computing device is an interactive whiteboard.

10. A stylus for providing input to a touch-sensitive screen of a computing device, the stylus comprising:
a body;
a haptic feedback mechanism within the body;
a logic processor; and
a memory storing instructions executable by the processor to provide haptic output to the body via the haptic feedback mechanism, the instructions executable to:
receive rotational position data indicating a rotational position of the stylus about a longitudinal axis of the body of the stylus;
receive travel direction data indicating a direction of travel of a tip of the stylus relative to the touch-sensitive screen;
receive first device type data indicating a first device type of the computing device;
use at least the rotational position data, the first device type data, and the travel direction data to determine one or more characteristics of a first drive signal;
cause the first drive signal to be transmitted to the haptic feedback mechanism to generate first haptic output at the body of the stylus;
receive second device type data indicating a second device type of the computing device different from the first device type;
use at least the rotational position data, the second device type data, and the travel direction data to determine one or more characteristics of a second drive signal different from the first drive signal;
cause the second drive signal to be transmitted to the haptic feedback mechanism within the body of the stylus to generate second haptic output at the body different from the first haptic output; and
cause the second haptic output at the body to provide a second tactile sensation different from a first tactile sensation caused by the first haptic output.

11. The stylus of claim 10, wherein the instructions are executable to:
receive tip shape data indicating a shape of the tip of the stylus; and
use at least the rotational position data, the travel direction data, the first device type data, and the tip shape data to determine the one or more characteristics of the first drive signal.

12. The stylus of claim 11, wherein the tip shape data describes a virtual shape of the tip of the stylus.

13. The stylus of claim 11, wherein the tip shape data describes a physical shape of the tip of the stylus.

14. The stylus of claim 10, wherein the instructions are executable to:
receive tilt data indicating an angular position of the longitudinal axis of the body of the stylus relative to a plane of the touch-sensitive screen;
use at least the tilt data to determine a tip area of the tip that is in contact with the touch-sensitive screen; and
use at least the rotational position data, the travel direction data, the first device type data, and the tip area to determine the one or more characteristics of the first drive signal.

15. The stylus of claim 14, wherein the instructions are executable to:
receive tip shape data indicating a shape of the tip of the stylus; and
use at least the tilt data and the tip shape data to determine the tip area of the tip that is in contact with the touch-sensitive screen.

16. The stylus of claim 10, wherein the travel direction of the tip defines an angle in a plane of the touch-sensitive screen relative to a screen coordinate system, and the instructions are executable to change an amplitude of the first drive signal at different angles of the travel direction in the plane of the touch-sensitive screen.

17. The stylus of claim 10, wherein the travel direction of the tip defines an angle in a plane of the touch-sensitive screen relative to a screen coordinate system, and the instructions are executable to change a frequency of the first drive signal at different angles of the travel direction in the plane of the touch-sensitive screen.

18. A computing device in a stylus for providing input to a touch-sensitive screen of another computing device, the computing device in the stylus comprising:
a logic processor; and
memory storing instructions executable by the processor to provide haptic output to a body of the stylus, the instructions executable to:
receive rotational position data indicating a rotational position of the stylus about a longitudinal axis of the body of the stylus;
receive travel direction data indicating a direction of travel of a tip of the stylus relative to the touch-sensitive screen;
receive first device type data indicating a first device type of the another computing device;
use at least the rotational position data, the first device type data, and the travel direction data to determine one or more characteristics of a first drive signal;
cause the first drive signal to be transmitted to a haptic feedback mechanism within the body of the stylus to generate first haptic output at the body;
receive second device type data indicating a second device type of the another computing device different from the first device type;
use at least the rotational position data, the second device type data, and the travel direction data to determine one or more characteristics of a second drive signal different from the first drive signal;
cause the second drive signal to be transmitted to the haptic feedback mechanism within the body of the stylus to generate second haptic output at the body different from the first haptic output; and
cause the second haptic output at the body to provide a second tactile sensation different from a first tactile sensation caused by the first haptic output.

19. The computing device of claim 18, wherein the instructions are executable to:
  receive tip shape data indicating a shape of the tip of the stylus; and
  use at least the rotational position data, the travel direction data, the first device type data, and the tip shape data to determine the one or more characteristics of the first drive signal.

\* \* \* \* \*